(12) United States Patent
Knorovich et al.

(10) Patent No.: US 12,141,218 B1
(45) Date of Patent: Nov. 12, 2024

(54) SYSTEM AND METHOD FOR COLLECTING CONTENT FROM NETWORK SERVERS

(71) Applicant: THE DATA COMPANY TECHNOLOGIES INC., Wilmington, DE (US)

(72) Inventors: Uri Knorovich, Tel Aviv (IL); Alon Bar Tzlil, Tel Aviv (IL); Yuval Shalev, Herzliya (IL)

( * ) Notice: Subject to any disclaimer, the term of this patent is extended or adjusted under 35 U.S.C. 154(b) by 63 days.

(21) Appl. No.: 18/142,039

(22) Filed: May 2, 2023

(51) Int. Cl.
 *G06F 16/00* (2019.01)
 *G06F 16/951* (2019.01)
 *G06F 16/955* (2019.01)

(52) U.S. Cl.
 CPC ........ *G06F 16/9566* (2019.01); *G06F 16/951* (2019.01)

(58) Field of Classification Search
 None
 See application file for complete search history.

(56) References Cited

U.S. PATENT DOCUMENTS

| | | | | |
|---|---|---|---|---|
| 7,676,553 | B1 * | 3/2010 | Laucius | G06F 16/951 |
| | | | | 709/219 |
| 10,083,222 | B1 * | 9/2018 | Katzer | G06F 16/951 |
| 2005/0004889 | A1 * | 1/2005 | Bailey | G06Q 40/04 |
| 2019/0281064 | A1 * | 9/2019 | Patrich | H04L 63/101 |

* cited by examiner

*Primary Examiner* — Anhtai V Tran
(74) *Attorney, Agent, or Firm* — AlphaPatent Associates Ltd.; Daniel J. Swirsky

(57) ABSTRACT

Providing content from network servers by receiving a data request from a client performing an internet search on a search engine based on the data request, accessing URLs relevant to the request resulting from the search, inputting parsed text from the accessed URLs into a software model configured to identify terms of use in the URL, accessing a robots.txt of the URL to receive collection rules that define terms for collecting data in the URL, sending a data request to the URL, where the request includes the details of the requesting entity and an opt-out option for the URL, and collecting the data in the URLs.

10 Claims, 3 Drawing Sheets

SYSTEM AND METHOD FOR COLLECTING CONTENT FROM NETWORK SERVERS

FIELD

The invention relates to collecting content from network servers.

BACKGROUND

The amount of data transferred over the Internet increases gradually. Companies and persons store their data online, such as e-commerce websites, social networks, video storage websites, governmental databases and others. In addition, there is a growing need to access this data for business reasons, such as monitoring SEO efforts, performing market research, analyzing stock market trends, testing websites, scraping social networks and the like.

Companies seeking to scrape data from websites cannot access all websites the same way, as these websites operate under different legal and business terms of compliance and copyright. These legal terms relate to access to the data and use of the data, copy the data, analyze the data etc. The terms depend on the website's terms of use and "robot txt" that determines what part of the data is available to computerized machines such as bots wishing to collect the data, and to which bots can access the data.

Hence, there is a need to enable organizations to collect data from the Internet efficiently, cost-effectively and relatively fast.

SUMMARY

In one aspect of the invention a method is provided for providing content from network servers, the method comprising receiving a data request from a client, performing an internet search on a search engine based on the data request, accessing URLs relevant to the request resulting from the search, inputting parsed text from the accessed URLs into a software model configured to identify terms of use in the URL, accessing a robots.txt of the URL to receive collection rules that define terms for collecting data in the URL, sending a data request to the URL, where the request includes the details of the requesting entity and an opt-out option for the URL, and collecting the data in the URLs.

In some cases, the method further comprises generating a data request comprises adding an identifier of the requesting entity to the TCP packet included in the data request. In some cases, the method further comprises assigning segments to the URLs based on types of data included in the URLs.

In some cases, the method further comprises searching for the data after segmentation, to see if the data appears elsewhere on the internet; define the content as public knowledge if the content appears on another URL.

In some cases, the types of data are selected from article, video, audio, image, software code, career page, home page, social network, Q&A forms and a combination thereof.

In some cases, the method further comprises verifying that the data in the URLs can be collected according to compliance regulations.

In some cases, the model is target to output a license model from a closed group of licenses based on text comparison. In some cases, the method further comprises parsing the text in the accessed URLs. In some cases, the parsing further comprises capturing images of the content in the accessed URLs. In some cases, the method further comprises filtering the segmented data based on data types that appear in the data request.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

The invention, in embodiments thereof, provides a system and method for collecting data over the internet. The data is collected from web servers that store the data. The entity that collects the data accesses the data according to URLs of the websites that store their content on the web servers. A Uniform Resource Locator (URL), defines a web address that specifies its location on a computer network and a mechanism for retrieving it.

The data to be collected is defined by an organization, a computerized software or a person when inputting a data request into a server, for example, a request server having an interface at a computer software or over the internet. The request is then processed and a search process is performed in order to output URLs that are most relevant to the request. Then, the URLs are analyzed in order to verify that the data can be collected, or what parts can be collected, based on the compliance regulations and rules that are relevant to the URL and based on the processes to be performed on the data. For example, in case the requesting entity wishes to copy the entire data in the URL in order to perform certain computations and the URL's compliance rules prevent such copying, the process may move to the next URL.

Figure 1:
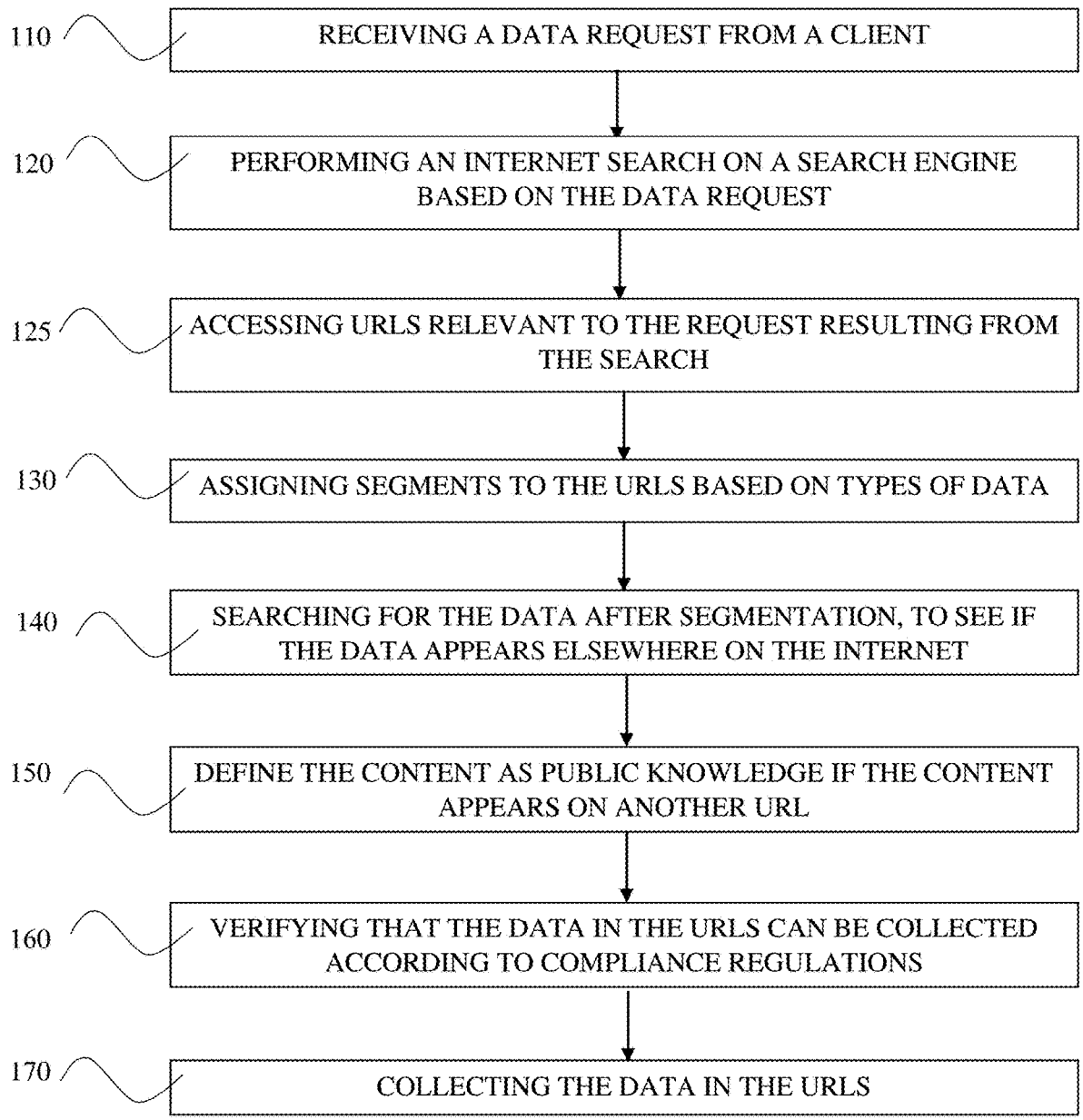
FIG. 1 shows a method for collecting data from web servers based on a data request, according to exemplary embodiments of the invention.

FIG. 1 shows a method for collecting data from web servers based on a data request, according to exemplary embodiments of the invention.

Step 110 discloses receiving a data request from a client. The data request may be received via an online portal, such as a web page, or via a client terminal stored in a client device, said client terminal communicates with the interface communicating with the peer manager that selects the delivery peer to perform the missions included in the request. The request comprises data, such as free text inputted by a person or computer software, or selections from a limited group of values. An example of such a data request may be "please provide all data about a specific clothing item as appearing in Amazon's websites in the UK", "please provide all the data about a specific band's concerts in Austria during 2022" and the like.

Step 120 discloses performing an internet search on a search engine based on the data request. The search may be performed by copying the data request into a search engine. The search engine may be public, such as Google search engine, or a proprietary of a particular organization. The data from the data request may be translated to a language compatible to the search engine or a language more likely to provide results, for example in case the request is for a German person, the queries inputted into the search engine may be in the German language. The method may comprise generating search queries based on the data request and based on a set of rules. The search queries may be outputted by a software model having a target function. The target function may be to maximize a relevance score outputted to the queries, or to maximize the number of results to the search query. The target function may differ based on a desired type of content, such as video, software code and the like.

Step 125 discloses accessing URLs relevant to the request resulting from the search. Accessing the URLs may be performed by sending HTML requests to the URLs from a computerized machine. Accessing the URLs may include reviewing the content appearing in the URLs without copying the content to a memory address accessible to the computerized machine (external to the web server that stores the content of the URL).

Step 130 discloses assigning segments to the URLs based on types of data. The segments may include text, such as an article, image, Excel sheet, PowerPoint presentation, video, audio, image, software code, career page, home page, social network, Q&A forms etc.

Step 140 discloses searching for the data after segmentation, to see if the data appears elsewhere on the internet. Searching may be done using the same search engine or another search engine, using the same or different search queries. Searching after segmentation may be done in case the data cannot be collected from the URLs according to compliance limitations applied to the content in the URLs as elaborated below. For example, in case the terms of use in the URL dictate that the content can only be viewed but not downloaded or copied, but the data request requires the data to be copied. As such, the data found in the first search results (step 120) cannot be used for the purposes of the data request.

Step 150 discloses define the content as public knowledge if the content appears on another URL. For example, in case the same video or article is found in a number of URLs that exceed a threshold, the video or article can be defined as public knowledge and the terms of use do not apply to the video or article.

Step 160 discloses verifying that the data in the URLs can be collected according to compliance regulations. Such verifying may be done automatically by checking the terms of use in the URL or by defining the content as public knowledge.

Step 170 discloses collecting the data in the URLs. The collection may be done by downloading the content to a memory address or a server selected by the computerized machine that performs the methods disclosed herein.

Figure 2:
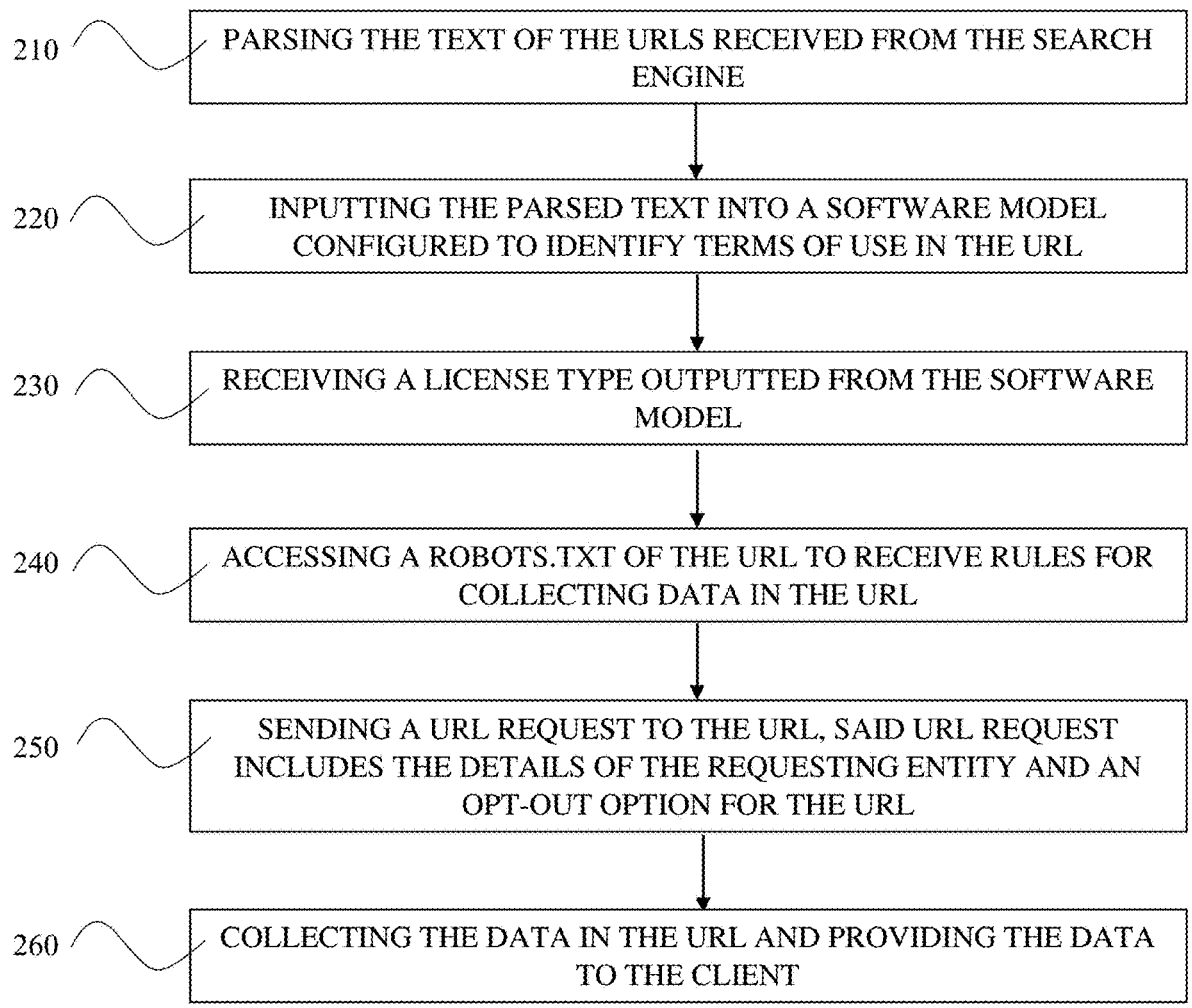
FIG. 2 shows a method for verifying that the data can be collected from web servers, according to exemplary embodiments of the invention.

FIG. 2 shows a method for verifying that the data can be collected from web servers, according to exemplary embodiments of the invention.

Step 210 discloses parsing the text of the URLs received from the search engine. Parsing may be done without copying the content from the URLs to the server that performs the data collection process. Parsing may comprise capturing images of the text included in the URL, hence collecting the text without copying the text. The images may then be parsed by image processing techniques selected by persons skilled in the art, such as optical character recognition (OCR). In some cases, parsing the data from the URL may include other computer vision techniques that imitate users browsing the web pages.

Step 220 discloses inputting the parsed text into a software model configured to identify terms of use in the URL. The software model is configured to perform processes that output a license type of the content included in the URL. In some cases, the model may output probabilities associated with multiple license types, such as 72% for type #3 and 28% for type #5. The software model may identify the specific web page in which the license is detailed, and in a second phase identify the license type in the text on the specific web page, assuming the website contains multiple web pages.

Step 230 discloses receiving a license type outputted from the software model. the model may output a license type from a closed group, for example, license types selected from—1. Free use, 2. Limited use, 3. MIT license. 4. Open source. 5. Creative commons for images and others. The model may search for the text representing all the license types in the parsed text.

Step 240 discloses accessing a robots.txt of the URL to receive rules for collecting data in the URL. A Robot.txt is a configuration file that appears in the software code of websites and dictates how bots can access the data in the specific URL.

Step 250 discloses sending a URL request to the URL, said URL request includes the details of the requesting entity and an opt-out option for the URL. The request may be an HTML request, in which the requesting entity requests specific content items in the URL, such as only videos, only images, both text and images without metadata and the like. The request may detail the communication protocol that the requesting entity wishes to use, for example, TCP, UDP, and the like, and an IP address into which the requested content is to be downloaded, or the IP address of the requesting entity.

In some cases, the data request comprises a packet header with the name of the requesting entity and contact details. In some cases, the packet is amended according to the robot.txt and the page type of the URL. Thus, the data request may differ according to the URL type—for example, a request for a video file or stream may require a UDP connection.

Step 260 discloses collecting the data in the URL and providing the data to the client. The collection may be done by copying the data to a desired network server or sending the data to a messaging account such as an email message or an instant messaging account.

Figure 3:
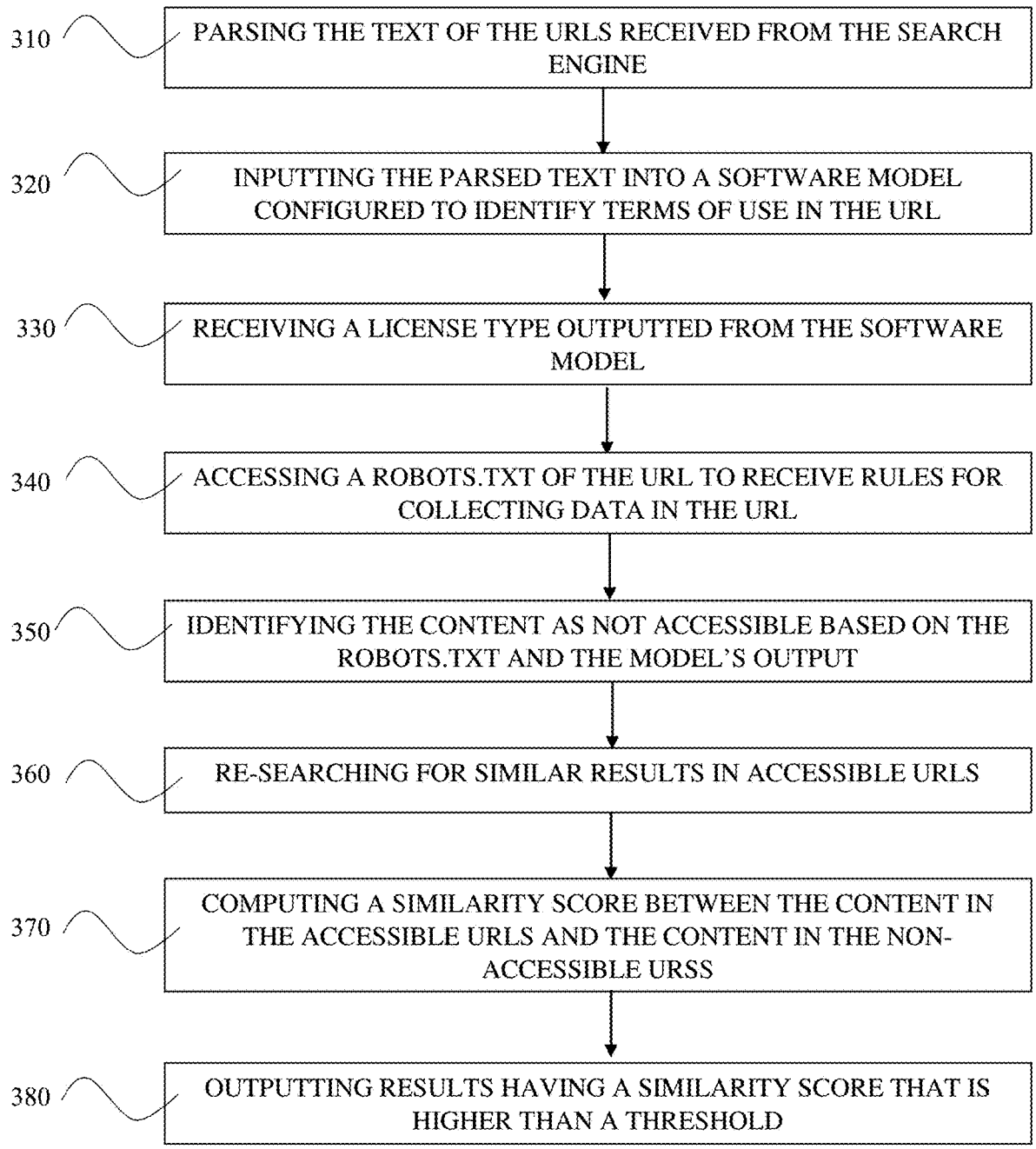
FIG. 3 shows a method for collecting alternative content based on the data request and the content in the selected URLs, according to exemplary embodiments of the invention.

FIG. 3 shows a method for collecting alternative content based on the data request and the content in the selected URLs, according to exemplary embodiments of the invention. The method may be performed in case the desired content cannot be supplied due to the terms of use appearing in the URLs that store the desired content.

Step 310 discloses parsing the text of the URLs received from the search engine. Parsing may be done without copying the content from the URLs to the server that performs the data collection process. Parsing may comprise capturing images of the text included in the URL, hence collecting the text without copying the text. The images may then be parsed by image processing techniques selected by persons skilled in the art, such as optical character recognition (OCR). In some cases, parsing the data from the URL may include other computer vision techniques that imitate users browsing the web pages.

Step 320 discloses inputting the parsed text into a software model configured to identify terms of use in the URL. The software model is configured to perform processes that output a license type of the content included in the URL. In some cases, the model may output probabilities associated with multiple license types, such as 72% for type #3 and 28% for type #5. The software model may identify the specific web page in which the license is detailed, and in a second phase identify the license type in the text on the specific web page, assuming the website contains multiple web pages.

Step 330 discloses receiving a license type outputted from the software model. the model may output a license type from a closed group, for example, license types selected from—1. Free use, 2. Limited use, 3. MIT license. 4. Open source. 5. Creative commons for images and others. The model may search for the text representing all the license types in the parsed text.

Step 340 discloses accessing a robots.txt of the URL to receive rules for collecting data in the URL. A Robot.txt is a configuration file that appears in the software code of websites and dictates how bots can access the data in the specific URL.

Step 350 discloses identifying the content as not accessible based on the robots.txt and the model's output. Identifying the content as not accessible includes defining the content as not usable to the entity that inputted the data request. For example, the data request may include usage properties for the content, such as marketing analytics, while the terms of use of the URL that contains the content prevent such usage. Or, the content cannot be translated, and the data requests require translation of the data, for example in order to publish a portion of the content, for example, a specific table, in a specific language.

Step 360 discloses re-searching for similar results in accessible URLs. Researching may include inputting other search queries into the search engine, which are search queries not inputted in the search that yielded the URLs parsed in step 310. Hence, the re-searching may include generating search queries by a software model based on a set of rules that use the data in the data request as input. The re-searching may comprise filtering the content by removing the non-accessible URLs from the list of results.

Step 370 discloses computing a similarity score between the content in the accessible URLs and the content in the non-accessible URSs. The similarity may include comparing text in the accessible URLs and the non-accessible URSs. In some cases, the comparison may refer to a specific type or segment of content in the accessible URLs and the non-accessible URSs, the type may be images, videos, graphs, tables and the like.

Step 380 discloses outputting results having a similarity score that is higher than a threshold. The threshold may differ from one search to another. The threshold may be automatically increased according to the popularity of a search term on the internet. The threshold may be inputted by the client in the data request.

The methods disclosed above are implemented using a computerized machine, such as a device or a virtual machine operating on a server, such as AWS, Azure, Google cloud and the like. The computerized machine comprises a processor for executing a set of instructions. The processor may be a hardware-based processor, a microprocessor, a general-purpose processor, and the like. The computerized machine comprises a memory for storing a set of instructions elaborated in the methods disclosed herein. The computerized machine comprises or is communicating with the model used to analyze the text included in the websites.

It should be understood that the above description is merely exemplary and that there are various embodiments of the invention that may be devised, mutatis mutandis, and that the features described in the above-described embodiments, and those not described herein, may be used separately or in any suitable combination; and the invention can be devised in accordance with embodiments not necessarily described above.

While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the invention is not limited to the particular embodiments described herein.

What is claimed is:

1. A method of providing content from network servers, the method comprising:
   receiving a data request from a client;
   performing an internet search on a search engine based on the data request;
   accessing URLs relevant to the request resulting from the search;
   inputting parsed text from the accessed URLs into a software model configured to identify terms of use in the URLs;
   accessing a robots.txt of the URLs to receive collection rules that define terms for collecting data in the URLs;
   sending a data request to the URL, said request includes the details of the requesting entity and an opt-out option for the URLs; and
   collecting the data in the URLs.

2. The method of claim 1, further comprising generating a data request comprises adding an identifier of the requesting entity to the TCP packet included in the data request.

3. The method of claim 1, further comprising assigning segments to the URLs based on types of data included in the URLs.

4. The method of claim 3, further comprising:
   searching for the data after segmentation, to see if the data appears elsewhere on the internet; and
   defining the content as public knowledge if the content appears on another URL.

5. The method of claim 3, wherein the types of data are selected from article, video, audio, image, software code, career page, home page, social network, Q&A forms and a combination thereof.

6. The method of claim 1, further comprising verifying that the data in the URLs can be collected according to compliance regulations.

7. The method of claim 1, wherein the model is target to output a license model from a closed group of licenses based on text comparison.

8. The method of claim 1, further comprising parsing the text in the accessed URLs.

9. The method of claim 8, wherein the parsing further comprises capturing images of the content in the accessed URLs.

10. The method of claim 1, further comprising filtering the segmented data based on data types that appear in the data request.

\* \* \* \* \*